(12) United States Patent
Fujita

(10) Patent No.: US 7,223,050 B2
(45) Date of Patent: May 29, 2007

(54) CONTAMINATION DIFFUSION PREVENTING STRUCTURE IN CONTAMINATED AREA

(75) Inventor: Koji Fujita, Chiba (JP)

(73) Assignee: Nippon Sheet Glass Co., Ltd., Tokyo (JP)

(*) Notice: Subject to any disclaimer, the term of this patent is extended or adjusted under 35 U.S.C. 154(b) by 0 days.

(21) Appl. No.: 10/517,290

(22) PCT Filed: Apr. 14, 2003

(86) PCT No.: PCT/JP03/04755

§ 371 (c)(1),
(2), (4) Date: May 23, 2005

(87) PCT Pub. No.: WO03/103866

PCT Pub. Date: Dec. 18, 2003

(65) Prior Publication Data

US 2005/0232702 A1 Oct. 20, 2005

(30) Foreign Application Priority Data

Jun. 7, 2002 (JP) ............................. 2002-167010

(51) Int. Cl.
*B09C 1/08* (2006.01)

(52) U.S. Cl. ............................................... 405/129.45
(58) Field of Classification Search ........... 405/129.45, 405/129.6, 129.65, 129.8
See application file for complete search history.

(56) References Cited

U.S. PATENT DOCUMENTS 6,357,968 B1 * 3/2002 Dwyer et al. ............... 405/269
6,699,321 B2 * 3/2004 Pelot et al. .................. 106/711

FOREIGN PATENT DOCUMENTS

| JP | 10-311082 A | 11/1998 |
| JP | 2001-200236 A | 7/2001 |
| JP | 2002-79233 A | 3/2002 |
| SU | 1423548 A | * 9/1988 |

* cited by examiner

Primary Examiner—John Kreck
(74) Attorney, Agent, or Firm—Fulbright & Jaworski LLP

(57) ABSTRACT

In order to effectively prevent diffusion of a harmful substance to a non-polluted soil side with a relatively simple and inexpensive construction without requiring a large-scale system, a pollution diffusion preventive wall member is installed underground for partitioning between a polluted soil side and a non-polluted soil side, the wall member being formed of wall forming material having water-permeability and containing a rare earth compound carried therein.

11 Claims, 4 Drawing Sheets

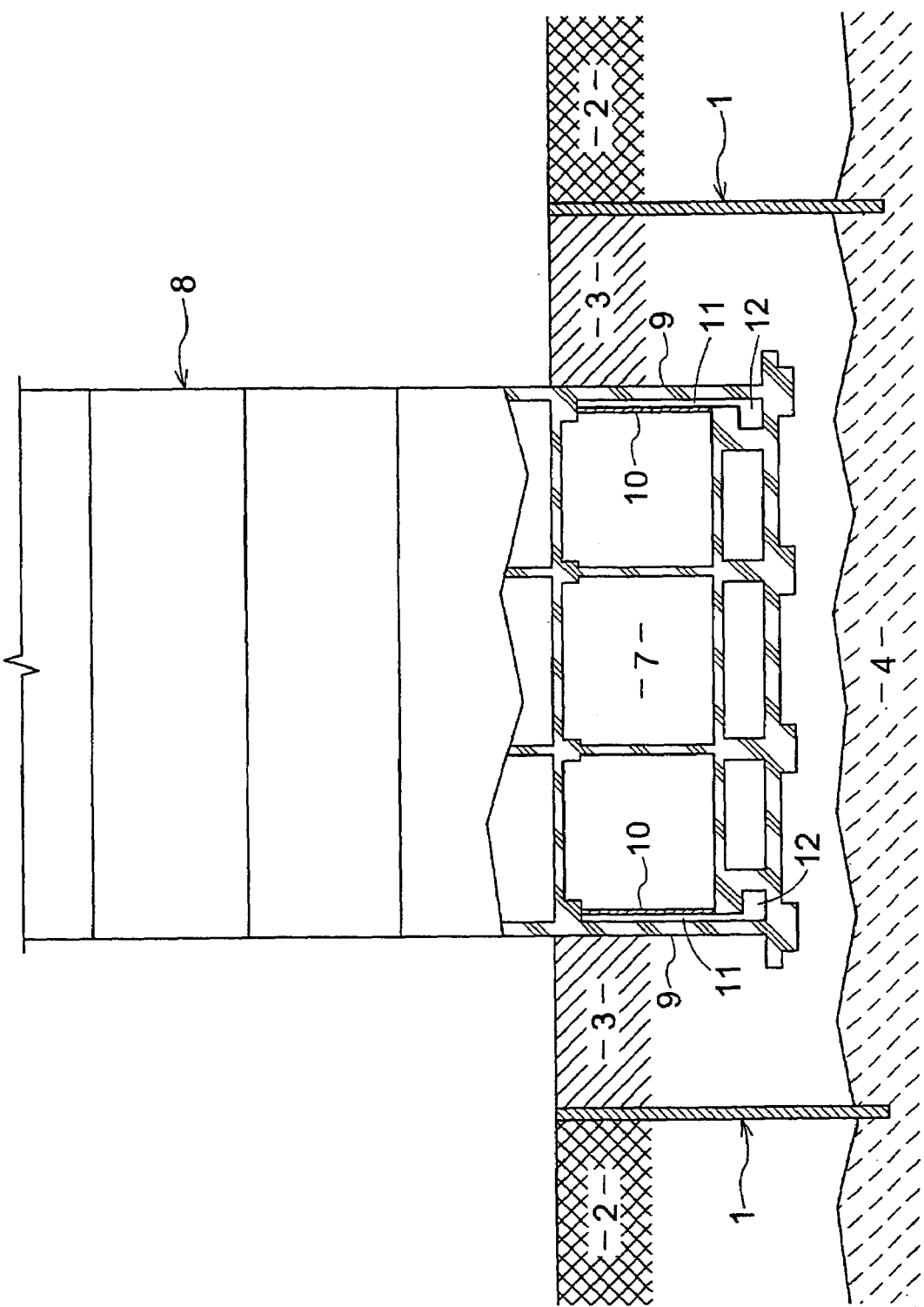

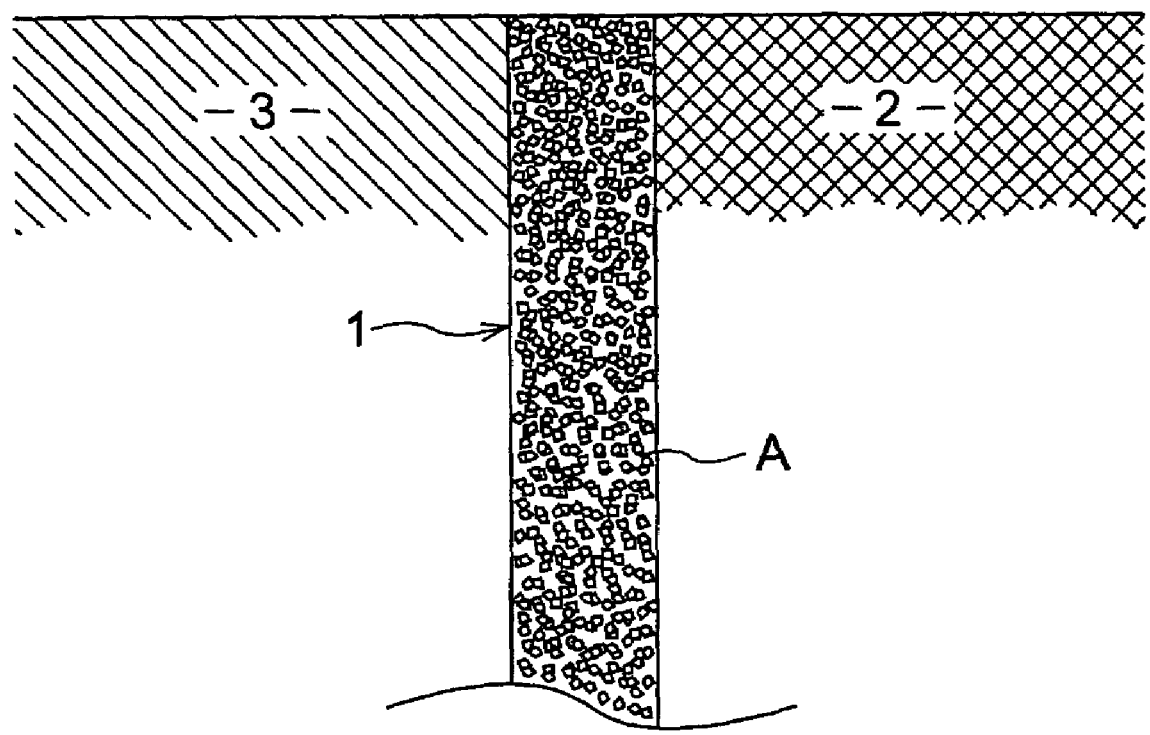

CONTAMINATION DIFFUSION PREVENTING STRUCTURE IN CONTAMINATED AREA

This is a §371 of PCT/JP03/04755 filed Apr. 14. 2003, which claims priority from Japanese 2002-167010 filed Jun. 7, 2002, each of which are hereby incorporated by reference in their entireties.

1. Technical Field

The present invention relates to a construction for preventing diffusion of pollution in a polluted land. The construction comprises a wall member for preventing pollution diffusion installed underground in a polluted land for partitioning between a polluted soil side and a non-polluted soil side in the land.

2. Background Art

Such pollution diffusion preventive construction as above has been in use in e.g. a factory site whose soil is or can be polluted with a harmful substance such as a chemical agent, wherein a pollution diffusion preventive wall member is installed underground at the site for preventing diffusion of the harmful substance via the wall member to a non-polluted soil side at the site. The prior art has proposed using an iron plate as such wall member for partitioning between the polluted soil side and the non-polluted soil side.

However, such wall member in the form of an iron plate does not permit passage of water such as underground water or rain water. Hence, in the case of e.g. heavy rain fall, a large amount of rain water fallen into the polluted soil side can flow over the wall member into the non-polluted soil side. As a result, the harmful substance contained in the polluted soil side can be diffused to the non-polluted soil side of the land.

In order to avoid the above, it is needed to collect the rain water or underground water polluted with the harmful substance and treat the water to rendering it harmless on the polluted soil side and then drain this treated water. This would require a significantly large system, hence, high system costs.

Further, the iron plate wall member suffers high risk of erosive rupture. The ruptured wall member would permit diffusion therethrough of the harmful substance via e.g. underground water to the non-polluted soil side.

The present invention has addressed to the above-described shortcomings of the prior art. A primary object of the present invention is to provide a pollution diffusion preventive construction to be installed underground in a polluted land, which construction is relatively simple and can be formed at low costs, but which can effectively prevent diffusion of harmful substance to non-polluted soil side of the land.

DISCLOSURE OF THE INVENTION

According to the first characterizing feature of the present invention, in a construction for preventing diffusion of pollution in a polluted land, the construction comprising a wall member for preventing pollution diffusion installed underground in a polluted land for partitioning between a polluted soil side and a non-polluted soil side in the land, wherein the wall member is formed of wall forming material having water-permeability and containing a rare earth compound carried therein.

With the first characterizing feature of the invention described above, since the pollution diffusion preventive wall member has water-permeability, even in the event of heavy rain fall, the rain water fallen onto the polluted soil side will flow through the wall member to the non-polluted soil side, thus preventing the water from flowing over the wall member to the non-polluted soil side. Further, as this water-permeable wall member is formed of the wall forming material containing a rare earth compound carried therein, the rain water or the like which passes through the wall member comes into contact with the rare earth compound which has an adsorptivity about 4 to 6 times higher than e.g. conventionally employed alumina, to the harmful substance of arsenic, fluorine, chromium, cadmium, lead, etc., so that the water after being purified and ameliorated will flow to the non-polluted soil side.

Therefore, in the case of application to a polluted soil land which contains or can contain arsenic, fluorine, chromium, cadmium, lead, etc. as a harmful substance, no large-scale system will be needed. Instead, the invention can provide a construction which is relatively simple and can be formed at low costs, but which can effectively prevent diffusion of harmful substance to non-polluted soil side of the land.

According to the second characterizing feature of the present invention, said wall forming material is provided in the form of a ceramics block containing granules of the rare earth compound mixed therein.

With the second characterizing feature of the present invention described above, as the material forming the wall member is provided in the form of a ceramics block containing granules of the rare earth compound mixed therein, the wall member can be assembled relatively easily by e.g. arranging and/or stacking a number of such ceramics blocks side by side and/or one on another.

And, as the granules of the rare earth compound are mixed in each such ceramics block, even if the amount of the rare earth compound mixed therein is small, there can be obtained a large effective area of contact between the compound and water passing through the wall member.

Accordingly, passed water can be cleaned and purified with efficiently utilizing such small amount of rare earth compound.

According to the third characterizing feature of the present invention, said wall forming material comprises granules formed by mixing a water-absorptive substance and the rare earth compound together.

With the third characterizing feature of the present invention described above, as the wall forming material comprises granules formed by mixing a water-absorptive substance and the rare earth compound together, the water-absorbent substance can take care of water absorption while the compound having the adsorptivity for the harmful substance is responsible for adsorbing the harmful substance from the absorbed water. Therefore, even in the case of a polluted land formed of a soil rich in underground water, the construction can reliably adsorb the harmful substance eluted into the underground water, thereby cleaning the soil.

And, as this soil conditioning agent, i.e. the wall forming material, is provided in the form of granules, unlike e.g. a material in the form of fine powder, it is possible to restrict formation of the material into large lumps when the material is mixed into the soil. Hence, the eluted material will be mixed uniformly with the entire soil. As will become apparent from experiment results described later, by effectively and efficiently utilizing a small amount of the harmful substance adsorptive agent, even a soil containing a great amount of underground water can be cleaned with effective adsorptive removal of the harmful substance.

The water-absorptive substance can be silicious marl containing silicon oxide ($SiO_2$) as a principal component thereof, or activated carbon, shirasu balloon, peat, pumice stone, etc. And, this substance will be used in the form of granules. Of the above-listed kinds of water-absorptive substances, silicious marl is particularly advantageous as being relatively inexpensive and having high water absorptivity, so that the cost of the soil conditioning agent can be reduced. In addition to the water absorptivity, silicious marl has also an appropriate degree of water permeability. Hence, by the harmful substance adsorptive agent uniformly present in the entire soil, the harmful substance can be adsorbed relatively evenly.

According to the fourth characterizing feature of the present invention, said wall forming material comprises a mixture of granules of the rare earth compound and a material of grains larger in diameter than the rare earth compound granules.

With the fourth characterizing feature of the present invention described above, as the wall forming material includes the granules of the rare earth compound, even if the amount of the rare earth compound contained therein is small, there can be obtained a large effective area of contact between the compound and water passing through the wall member, thus realizing effective water cleaning and amelioration.

Further, if the material includes the rare earth compound granules alone, there will be a possibility of agglomeration of the granules (formation into large lumps), which hinders the effective contact with the passing water. However, since the material also includes grain material larger in diameter than the rare earth compound granules, such agglomeration of the rare earth compound granules can be restricted by the mixed grain material with larger diameter, so that water purification and amelioration can proceed as desired.

The above-proposed construction provides a further advantage relating to formation and assembly the wall member. Namely, in the case of this construction, the construction can be formed relatively easily by first drilling a hole underground for the wall member and then charging the mixture of the rare earth compound granules and the grain material into the drilled hole.

According to the fifth characterizing feature of the present invention, said grain material comprise glass cullet.

With this fifth characterizing feature of the present invention, since the grain material to be mixed with the rare earth compound granules comprise glass cullet, the pollution diffusion preventive wall member can be formed by using glass cullet which is relatively inexpensive. Further, glass fragments generated from a glass making factory can be recycled for use. In such case, the pollution diffusion preventive wall member can be formed at even lower costs.

In addition, glass cullet exhibits alkaline property whereas the rare earth metal, as will be detailed later, shows enhanced adsorptivity in an alkaline atmosphere. Therefore, the harmful substance such as arsenic can be adsorbed in an efficient manner for effective cleaning and amelioration of the water. Further, even in the case of acid rain, the acidity of the rain water can be restricted by the glass cullet, so that the water conditioning effect can be maintained for an extended period of time.

According to the sixth characterizing feature of the present invention, said rare earth compound comprises ceric oxide hydrate or ceric hydroxide.

With the sixth characterizing feature of the invention described above, since the rare earth compound comprises ceric oxide hydrate or ceric hydroxide, this compound exhibits distinguished adsorptivity to arsenic, lead, etc. in particular among those listed kinds of harmful substances. Moreover, cerium is available relatively inexpensively and easily among the rare earth elements. Hence, the above construction is advantageous in terms of cost also.

BRIEF DESCRIPTION OF THE DRAWINGS

FIG. 4 is a schematic section view showing a pollution diffusion preventive construction for a polluted land relating to a further embodiment of the present invention, and FIG. 5 is a schematic section view showing a pollution diffusion preventive construction for a polluted land relating to a still further embodiment of the present invention.

BEST MODE OF EMBODYING THE INVENTION

A construction for preventing pollution diffusion in a polluted land relating to the present invention will be described in details by way of embodiments thereof with reference to the accompanying drawings.

Figure 1:
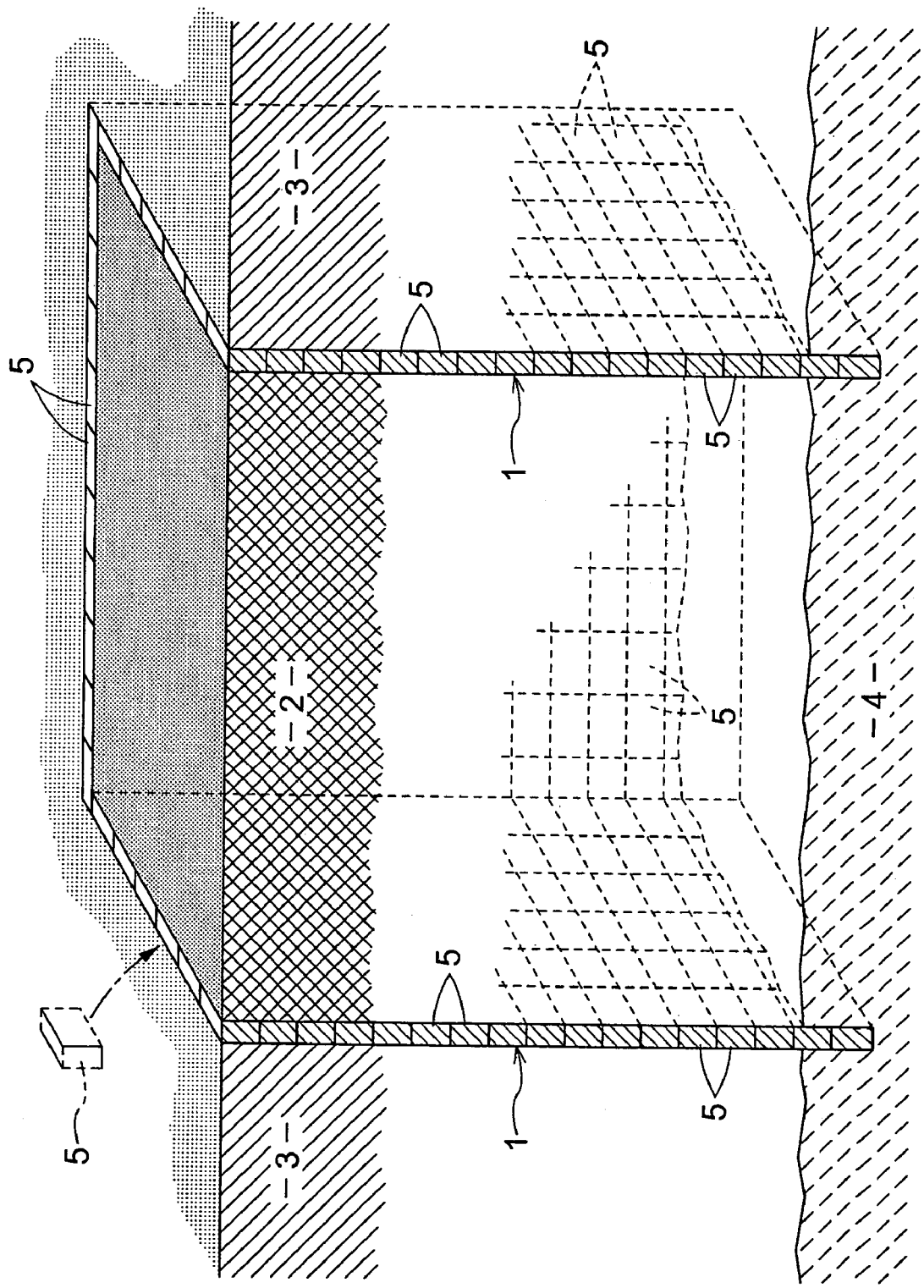
FIG. 1 is a schematic perspective view showing a pollution diffusion preventive construction for a polluted land.

This pollution diffusion preventive construction, as shown in FIG. 1, employs a pollution diffusion preventive wall member 1, wherein a polluted soil side 2 whose soil is or can be polluted with a harmful substance such as a chemical agent is partitioned from a non-polluted soil side 3 by means of the wall member 1 installed underground.

The wall member 1 is configured such that the member 1 extends from the vicinity of a ground surface across an underground water level to a lower water-impermeable layer 4 formed of clay, rock mass or the like, thereby to surround the polluted soil side 2.

This wall member 1 is assembled from a number of ceramics blocks 5 arranged side by side horizontally and vertically, each block 5 being formed of porous ceramics material having water permeability. And, each ceramics block 5 contains, as mixed therein, granules of a rare earth compound which is a compound of a rare earth metal.

The rare earth compound can be a compound of e.g. cerium (Ce), samarium (Sm), neodymium (Nd), gadolinium (Gd), lanthanum (La), yttrium (Y). These rare earth compounds have high adsorptivity to such harmful substances as arsenic (As), fluorine (F), chromium (Cr), cadmium (Cd), lead (Pb), etc.

Advantageously, these rare earth compounds are used in the form of oxide hydrates or hydroxides of the rare earth elements, e.g. ceric oxide hydrate ($CeO_2.1.6H_2O$), samarium oxide hydrate ($Sm_2O_3.4.1H_2O$), neodymium oxide hydrate ($Nd_2O_3.4.7H_2O$), gadolinium oxide hydrate ($Gd_2O_3.5.0H_2O$), lanthanum oxide hydrate ($La_2O_3.3.0H_2O$), yttrium oxide hydrate ($Y_2O_3.2.1H_2O$), ceric hydroxide ($Ce(OH)_3$ or $Ce(OH)_4$). and in the physical shape of fine granules of 0.1 to 2.0 μm in diameter.

Next, some specific examples of the ceramics block 5 will be described.

Silicious marl was mixed with beads material such as hollow glass beads, resin beads or sawdust. Then, this mixture was mixed with 10 wt. % of ceric oxide as a rare earth compound and 10 wt. % of glass cullet having alkaline property. The resultant mixture was shaped into a block and then calcinated at about 1300° C. The calcination resulted in oxidation of the beads material, so that a porous ceramics block having water permeability was obtained. Thereafter, this block was boiled in a bath of hydrochloric acid solution and then neutralized with sodium hydroxide for its hydration, whereby a ceramics block as a final product was obtained.

Respecting the pore diameter of the porous structure of the ceramics block, if the diameter exceeds 10 mm, this will diminish the effect of surface tension of passing water, thus resulting in excessive increase in its flow rate and corresponding reduction in the adsorptivity of the rare earth compound to the harmful substance. For this reason, it is preferred that the pore diameter be 10 mm or less.

An experiment was conducted on the porous ceramics block with a pore diameter less than 10 mm obtained as above. The experiment revealed that as water containing 0.11 mg/liter and eluted from a soil polluted with arsenic was caused to pass the ceramics block, the arsenic concentration was reduced to less than 0.001 mg/liter.

Figure 3:
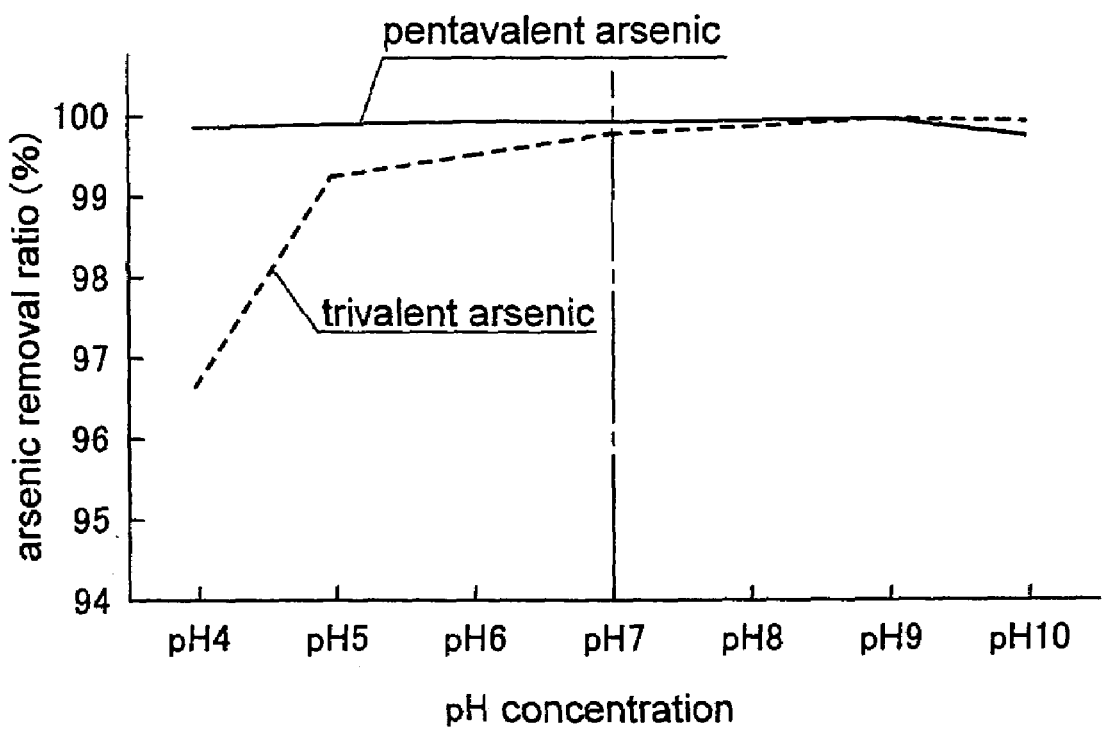
FIG. 3 is a graph showing arsenic adsorptivities of exemplary rare earth compounds relative to their pH concentrations.

Incidentally, the glass cullet having the alkaline property is used for improving the adsorptivity of the rare earth compound to arsenic. As may be apparent from the graph shown in FIG. 3 showing arsenic adsorptivities of exemplary rare earth compounds relative to their pH concentrations, the arsenic adsorptivities of rare earth compounds are enhanced in an alkaline atmosphere and this enhancement in the adsorptivity is especially conspicuous in the case of trivalent arsenic.

Alternatively, instead of the silicious marl employed in the foregoing example, alumina nano-whisker can be employed. In this case too, this whisker will be mixed with the beads material such as hollow glass beads, resin beads or sawdust and then mixed further with 10 wt. % of ceric oxide and 10 wt. % of glass cullet having alkaline property. The resultant mixture will be shaped into a block and then calcinated, whereby a ceramics block as a final product will be obtained.

In this case, the obtained ceramics block will have a very fine porous structure with a pore diameter at the nano order of less than 1 micron, so that this block will provide a significantly higher adsorptivity to the harmful substances.

Figure 2:
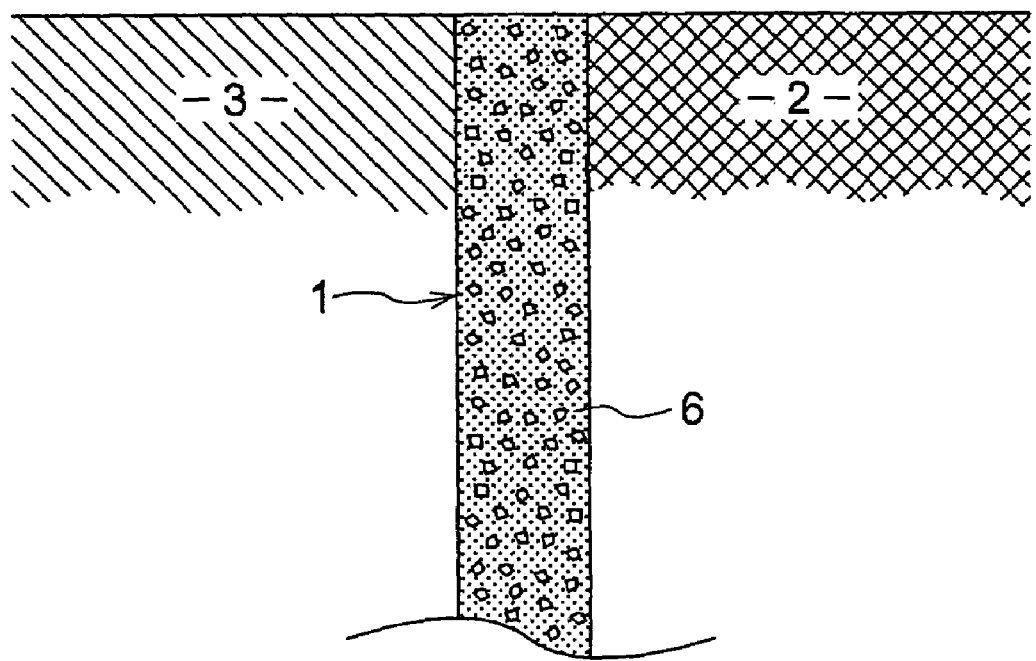
FIG. 2 is a schematic section view showing principal portions of the pollution diffusion preventive construction for a polluted land.

The pollution diffusion preventive wall member 1 can be formed by using a material other than the material in the form of the porous ceramics block 5 described above. An example thereof is shown in FIG. 2, in which the wall member 1 for partitioning between the polluted soil side 2 and the non-polluted soil side 3 is formed of a mixture 6 of granules of the rare earth compound and a material of grains (grain material) larger in diameter than the granules of the rare earth compound.

The rare earth compound, like the ceramics block 5 described in the foregoing example can be e.g. ceric oxide hydrate ($CeO_2 \cdot 1.6H_2O$), samarium oxide hydrate ($Sm_2O_3 \cdot 4.1H_2O$), neodymium oxide hydrate ($Nd_2O_3 \cdot 4.7H_2O$), gadolinium oxide hydrate ($Gd_2O_3 \cdot 5.0H_2O$), lanthanum oxide hydrate ($La_2O_3 \cdot 3.0H_2O$), yttrium oxide hydrate ($Y_2O_3 \cdot 2.1H_2O$), ceric hydroxide ($Ce(OH)_3$ or $Ce(OH)_4$) and in the physical shape of fine granules of 0.1 to 2.0 μm in diameter.

Preferably, the grain (i.e. "large granule") material to be mixed with the rare earth compound granules comprises typically glass cullet of a glass sheet, as well as any other alkaline substance such as limestone, tourmaline, concrete waste material and this grain material is to be used in the form of grains ranging in diameter from 1.0 mm to 5.0 mm.

Then, this grain material and the harmful substance adsorptive granules will be charged in a ratio from grain material 70 wt. % and harmful substance adsorptive grains 30 wt. % to grain material 50 wt. % and harmful substance adsorptive granules 50 wt. % into a e.g. a rotary mixer and well mixed together therein. The resultant mixture 6 having water permeability will be charged into a hole for the wall member drilled in the earth, thereby to form the wall member 1.

OTHER EMBODIMENTS

Next, other embodiments of the invention will be described. In the following discussion of the further embodiments, in order to avoid redundancy of description, the same components described in the foregoing embodiment will be only denoted with same reference marks or numerals, and will not be described again. Hence, the following discussion focuses on the differences from the foregoing embodiment.

(1) In the foregoing embodiment, the perimeter of the polluted soil side 2 is surrounded by the pollution diffusion preventive wall member 1, thereby to prevent diffusion of the harmful substance contained in the surrounding polluted soil side 2 to the non-polluted soil side 3. Instead, the perimeter of the non-polluted soil side 3 can be surrounded, thereby to prevent diffusion of the harmful substance contained in the surrounding polluted soil side 2 to the non-polluted soil side 3.

In this further embodiment shown in FIG. 4, the wall member 1 which is formed by assembling a number of ceramics blocks 5 together or by the mixture 6 of the granules of rare earth compound and the grain material is placed around the non-polluted soil 3 and on this non-polluted soil 3, e.g. a building 8 having an underground cellar 7 is built.

The underground cellar 7 comprises a double-walled structure including an outer wall 9 and an inner wall 10, with a water-passing gap 11 being formed between the walls 9, 10. In operation, water passing the outer wall 10 will flow down the gap 11 and get collected in a lower tank 12, from which the water will be discharged by means of an unillustrated pump.

According to this further embodiment, the non-polluted soil 3 on which the building 8 is built is protected by the wall member 1 against diffusion of the harmful substance from the polluted soil 2 and water such as underground water or rain water when flowing to the non-polluted soil 3 has already been rendered harmless.

Therefore, the water collected at the tank 12 can be discharged directly into e.g. preexisting sewage system, without having to be treated to be harmless.

(2) In the foregoing embodiments, the pollution diffusion preventive wall member 1 is formed by either the ceramics blocks 5 alone or the mixture 6 of the rare earth compound granules and the grain material alone. Alternatively, the wall member 1 can be a combination of the ceramics blocks 5 and the mixture 6.

In that case, various combinations will be possible, depending on the actual situation of the polluted land, such as using the ceramics blocks 5 and the mixture material 6 alternately or using the ceramics blocks 5 at a portion of the land where underground water passes, in order to avoid leak of the water and using the mixture material 6 at the other portions of the land.

(3) The ceramics block 5 for forming the wall member 1 is not limited to the ceramics block described in the foregoing embodiments. Instead, the wall member 1 can be formed by using blocks formed of porous concrete or synthetic resin having required water permeability.

Further, in case the wall member 1 is formed by using the mixture material 6, the gain material as the mixture material 6 is not limited to the alkaline substance such as the glass cullet proposed in the foregoing embodiment. Instead, sand, pebbles, gravels, etc. can also be used as "grain material".

Further, the wall member 1 can be formed by using a grain material A formed by mixing and shaping together water absorptive material such as silicious marl and the rare earth compound. Further alternatively, the grains or the grain material A per se can be charged and installed underground in the form of a wall, thereby to form the wall member 1 (see FIG. 5). In this case, the water absorptive substance in the form of grains and the rare earth compound will be charged into e.g. a rotary mixer and then mixed well therein. And, the resultant mixture will be pelletized by a pelletizer into pellets of about 2 mm in diameter. Then, the pellets will be dried and charged into a pit where the wall member 1 is to be formed, thereby forming the wall member 1.

INDUSTRIAL APPLICABILITY

Such pollution diffusion preventive construction described above can be installed underground at a polluted land such as a factory site, whose soil is or can be polluted with a harmful substance such as a chemical agent, so that the installed wall member constituting the construction may prevent diffusion of the harmful substance to the non-polluted soil side of the land.

What is claimed is:

1. A construction for preventing diffusion of pollution in a polluted land, the construction comprising a wall member for preventing pollution diffusion installed underground in a polluted land for partitioning between a polluted soil side and a non-polluted soil side in the land; wherein the wall member is formed of wall forming material having a water-permeability and containing a uniformly mixed rare earth compound carried therein; and wherein said wall forming material forming the wall member is provided in the form of a ceramics block containing granules of the rare earth compound mixed therein.

2. The pollution diffusion preventive construction according to claim 1, wherein said wall forming material comprises granules formed by mixing a water-absorptive substance and the rare earth compound together.

3. The pollution diffusion preventive construction according to claim 2, wherein said rare earth compound comprises ceric oxide hydrate or ceric hydroxide.

4. The pollution diffusion preventive construction according to claim 1, wherein said wall forming material comprises a mixture of granules of the rare earth compound and a material of grains larger in diameter than the rare earth compound granules.

5. The pollution diffusion preventive construction according to claim 4, wherein said grain material comprise glass cullet.

6. The pollution diffusion preventive construction according to claim 4, wherein said rare earth compound comprises ceric oxide hydrate or ceric hydroxide.

7. The pollution diffusion preventive construction according to claim 1, wherein said rare earth compound comprises ceric oxide hydrate or ceric hydroxide.

8. The pollution diffusion preventive construction according to claim 1, wherein said wall member is pre-formed by charging and installing said wall forming material containing said rare earth compound in advance at a location where said wall member is to be formed.

9. The pollution diffusion preventive construction according to claim 8, wherein said wall forming material comprises granules formed by mixing a water-absorptive substance and the rare earth compound together.

10. The pollution diffusion preventive construction according to claim 8, wherein said wall forming material comprises a mixture of granules of the rare earth compound and a material of grains larger in diameter than the rare earth compound granules.

11. The pollution diffusion preventive construction according to claim 8, wherein said rare earth compound comprises ceric oxide hydrate or ceric hydroxide.

* * * * *